United States Patent

Rambosek et al.

[11] Patent Number: 5,440,439
[45] Date of Patent: Aug. 8, 1995

[54] CASSETTE SCREW BOSSES HAVING RIBBED SURFACES

[75] Inventors: G. Phillip Rambosek, Shafer; Bradley J. Johanson, Hutchinson, both of Minn.

[73] Assignee: Minnesota Mining and Manufacturing Company, St. Paul, Minn.

[21] Appl. No.: 201,073

[22] Filed: Feb. 24, 1994

Related U.S. Application Data

[63] Continuation of Ser. No. 877,478, May 1, 1992, abandoned.

[51] Int. Cl.$^6$ ............................................. G11B 23/02
[52] U.S. Cl. ..................................... 360/132; 242/347
[58] Field of Search ................ 360/132; 242/197, 199, 242/359, 384, 390, 407; 411/437, 918

[56] References Cited

U.S. PATENT DOCUMENTS

| | | | |
|---|---|---|---|
| 3,362,280 | 1/1968 | Muller | 411/918 |
| 3,404,476 | 10/1968 | Hoffman | 411/176 |
| 3,837,690 | 9/1974 | Fraser et al. | 242/197 |
| 4,349,166 | 9/1982 | Tanaka et al. | 242/197 |
| 4,363,456 | 12/1982 | Goto | 242/199 |
| 4,371,286 | 2/1983 | Okamura et al. | 403/407 |
| 4,428,548 | 1/1984 | Gotoh | 242/199 |
| 4,466,585 | 8/1984 | Maehara | 360/132 |
| 4,706,149 | 11/1987 | Machida et al. | 360/132 |
| 4,763,218 | 8/1988 | Westfall et al. | 242/199 |
| 4,770,582 | 9/1988 | Junemann et al. | 411/437 |
| 4,962,898 | 10/1990 | Lee | 360/132 |
| 4,973,012 | 11/1990 | Hashizume et al. | 360/132 |
| 4,993,661 | 2/1991 | Tollefson | 242/188 |

FOREIGN PATENT DOCUMENTS

| | | | |
|---|---|---|---|
| 0597645 | 5/1960 | Canada | 411/437 |
| 0071996 | 2/1983 | European Pat. Off. | |
| 1028629 | 5/1953 | France | 411/437 |
| 2317736 | 11/1973 | Germany | 411/437 |
| 3130877 | 3/1982 | Germany | |
| 1-010479 | 1/1989 | Japan | |
| 1-134778 | 5/1989 | Japan | |
| 2-142910 | 1/1990 | Japan | 411/437 |
| 2024775 | 1/1980 | United Kingdom | |
| 2210352 | 6/1989 | United Kingdom | |
| 2219986 | 12/1989 | United Kingdom | |

*Primary Examiner*—John H. Wolff
*Assistant Examiner*—Brian E. Miller
*Attorney, Agent, or Firm*—Gary L. Griswold; Walter N. Kirn; Charles D. Levine

[57] ABSTRACT

A videocassette housing includes a base connected to a cover. Cover bosses are received within respective base bosses, and the cover is connected to the base by fasteners passing through the base bosses and cover bosses. The cover bosses extend only slightly beyond the centerline of the cassette and seat at the bottom of the base bosses. There is very little clearance between the bosses and the base boss has an inner surface defined by a plurality of ribs axially and equiangularly located along a circle.

11 Claims, 2 Drawing Sheets

CASSETTE SCREW BOSSES HAVING RIBBED SURFACES

This is a continuation of application Ser. No. 07/877,478 filed May 1, 1992 now abandoned.

TECHNICAL FIELD

The present invention relates to molded parts. More particularly, the present invention relates to molded cassette parts.

BACKGROUND OF THE INVENTION

Cassettes for holding reels of magnetic recording tape are well-known. Videocassettes for home use are sold commercially in large volumes into a very price-competitive market. Videocassettes typically include a housing having a supply reel of magnetic recording tape and a take-up reel. One end of the tape on the supply reel is attached to the take-up reel. As shown in FIG. 1, the housing typically includes a lower half, called the base 10, and an upper half, called the cover 12. A door (not shown), which protects the exposed length of tape 16 running between the supply reel 18 and the take-up reel 20 when the cassette is not in use, is attached to the cover. These cassettes operate in a videocassette recorder (VCR) which is capable of both playing and recording.

The tape 16 follows a prescribed path from the supply reel 18, over various tape guides, out of the housing, across a planar area called the left bridge 22, across an open area 24 where the tape is unsupported, to a planar area called the right bridge 26, and back into the housing to the take-up reel 20. The long side of the cassette on which the bridges 22, 26 are located is the front 28 of the cassette, and the long side opposite the front side of the cassette is the rear 30 of the cassette. The end of the cassette nearest the supply reel 18 is the left end 32 of the cassette, and the end of the cassette nearest the take-up reel 20 is the right end 34. These conventions are consistent with the manner in which a videocassette is typically inserted into the VCR; the front 28 of the cassette enters the machine first, with the base 10 on the bottom and the rear 30 of the cassette trailing.

Several other parts are also included in the cassette which enable the entire device to be safely and conveniently placed in a compatible machine for recording or playing. These parts include reel brakes 36, 38, which pivot on pins 40, 42, which typically are molded as part of the base 10. The reel brakes 36, 38 keep the reels 18, 20 from unrolling the tape 16 when the cassette is out the VCR. Other safety devices signal the VCR that the end of the tape has been reached, thereby preventing damage to the recorded material.

The base 10 and cover 12 fit together to enclose the tape reels 18, 20, along with the other internal parts, to exclude contaminants and protect the tape from damage. Alignment of the cover 12 with the base 10 is assured by screw bosses 44 in the base 10 which mate with corresponding bosses 46 in the cover 12, as shown in FIG. 2.

A significant part of the cassette cost arises from the size and complexity of the base 10 and cover 12. Videocassette housings typically are injection molded using a synthetic resin such as polystyrene or acrylonitrile-butadiene-styrene (ABS). Molds for the base and cover are typically designed to pull apart vertically, with one half of the mold forming substantially all of the internal parts of the base or cover, and the other half forming the outside surfaces of the part. Since videocassette housings have large wall areas, reducing wall thickness is important to minimize injection molding costs. Molding the walls and the integral components contribute to part cost not only through the quantity of material used in the part, but also through the time required to cool the part before ejection from the mold. While material consumption is proportional to the first power of wall thickness, the cooling time required before a part can be ejected from a mold is more nearly proportional to the square of the wall thickness. Since cooling the part sufficiently to allow ejection without warping or other damage consumes about 80% of the total molding time, reduction of wall thickness presents significant opportunities for increasing the productivity of the videocassette manufacturing process.

Another factor in determining wall thickness is resin flow during injection molding. During injection of the material into the mold, the various parts of the mold serve not only to determine the size and shape of the part being molded, but also act as passages through which the molten plastic must flow to reach other parts of the mold. If a wall section is too thin, the portion of the mold forming that wall section will be correspondingly thin, thereby restricting flow, and causing excessive reduction in injection pressure at points farther from the point of injection, or gate. As a result, the injection pressure may have to be raised, or the injection time may have to be lengthened, or both.

Increasing injection pressure can create undesirable side effects. U.S. Pat. No. 4,706,149 describes the ejection difficulties which can arise when injection pressures are high. Additionally, polymeric materials which are forced to flow through very thin channels at the high shear rates produced by high injection pressures often undergo excessive orientation of the polymer chains, which can weaken the part and directionally vary shrink rates, which can, in turn, lead to warping.

SUMMARY OF THE INVENTION

A videocassette housing according to the present invention includes a base having a plurality of bosses and a cover having a plurality of bosses corresponding in location to respective base bosses. The cover bosses are received within respective base bosses, and the cover is connected to the base by fasteners passing through the base bosses and cover bosses. Alternatively, the base bosses could be received within respective cover bosses.

The cover boss is shortened and extends only slightly beyond the centerline of the cassette and seats at the bottom of the base boss. The bottom of the base boss is raised to accommodate the shortened cover boss. Additionally, there is very little clearance between the cover boss and the base boss. This provides additional support for the bosses, and during carton drop tests, damage to the cassette is minimized as the shear point of the cassette is at the centerline of the cassette to protect against shearing failure at the bosses.

The base boss has an inner surface defined by a plurality of ribs. Preferably, the base bosses and cover bosses are cylindrical and the plurality of ribs are axially located along a circle to form the cylindrical inner surface. Also, the plurality are equiangularly spaced around the circle

DETAILED DESCRIPTION OF PREFERRED EMBODIMENTS

Figure 1:
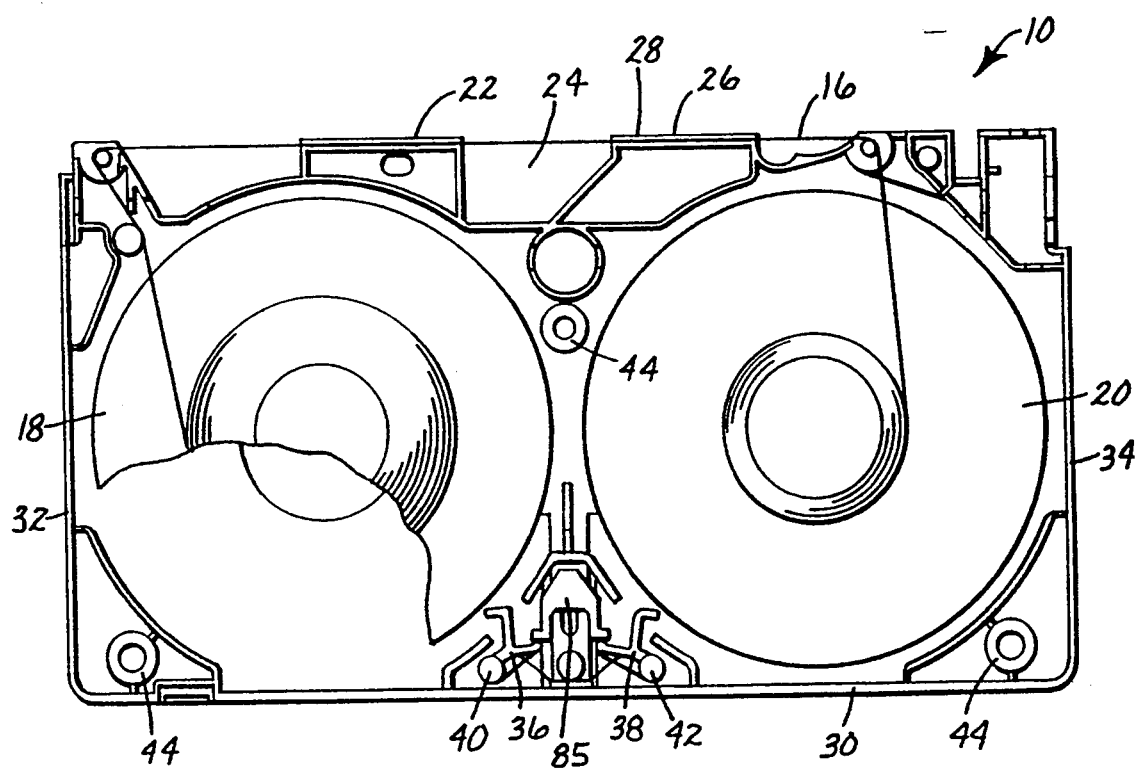
FIG. 1 is a plan view of the base of a known videocassette.

FIG. 1 shows a videocassette base 10. The cassette base 10 is typically produced by injection molding of a thermoplastic material in which a gate for injecting the molding material is located on the bottom of the cassette. The screw bosses 44, 46 of the present invention provide additional support for the cassette when thin walls are used.

Figure 4:
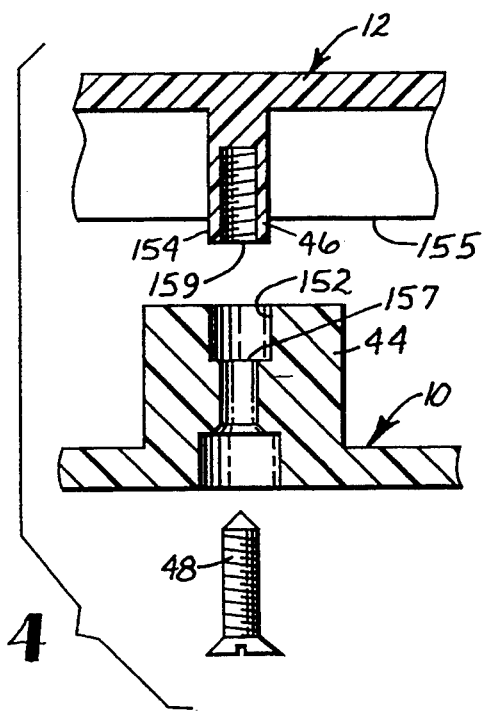
FIG. 4 is a cross-sectional view of the screw bosses of FIG. 3.

Referring to FIG. 4, two changes are made to the screw bosses 44, 46. The first change is that the inner screw boss 46 is shortened and extends only slightly beyond the centerline of the cassette and seats at the bottom of the outer screw boss 44. The inner screw boss 46 extends beyond the centerline of the cassette by only 0.49 cm, rather than the 0.75 cm of known cassettes. This is a 35% reduction. The total length of the inner screw boss 46 is 1.61 cm rather than the 1.85 cm of known cassettes, a reduction of 13%. The total length of the inner screw boss 46 that extends beyond the centerline is reduced from 40% to 30%.

The centerline 155 of the cassette is located in the same plane in which the base 10 and cover 12 of the cassette contact each other. The centerline is shown in FIG. 4 as the lower line of the cover 12 past which the boss 46 extends.

The second change is that the bottom of the screw boss 44 is raised to accommodate the shortened screw boss 46. Thus, the capture point of the cover screw boss 46 within the base screw boss 44 where the surface 159 engages the surface 157, is closer to the cover 12. Additionally, there is very little clearance between the cover screw boss 46 and the base screw boss 44. The inner diameter of the base screw boss 44 is substantially equal to the outer diameter of the cover screw boss 46, so that the surface 152 engages the surface 154 when the cover is assembled onto the base 10. This, combined with the increased thickness of the boss 44, provides additional support for the cover screw boss 46 and during carton drop tests, damage to the cassette is minimized as the shear point of the cassette is at the centerline of the cassette to protect against shearing failure between the base 10 and the cover 12 at the screw bosses. The fit between the base screw boss 44 and the cover screw boss 46 could provide a slight interference to more effectively constrain the boss 46 from excessive bending and breaking.

The edges of ribs are used to define the inner cylindrical surface 152 of the cover screw boss 46. The ribs are axial and are located radially around the surface 152. This improves manufacturability of parts having cylindrical surfaces. These cylindrical surfaces are "rib-defined cylinders."

Figure 2:
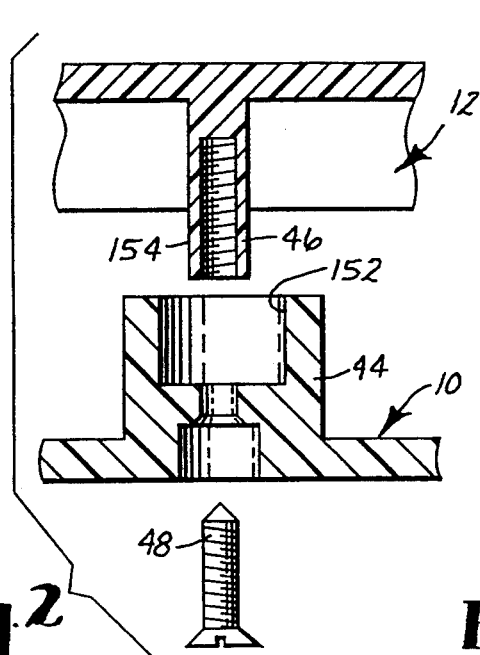
FIG. 2 is a cross-sectional view of the screw bosses of known cassettes.
Figure 3:
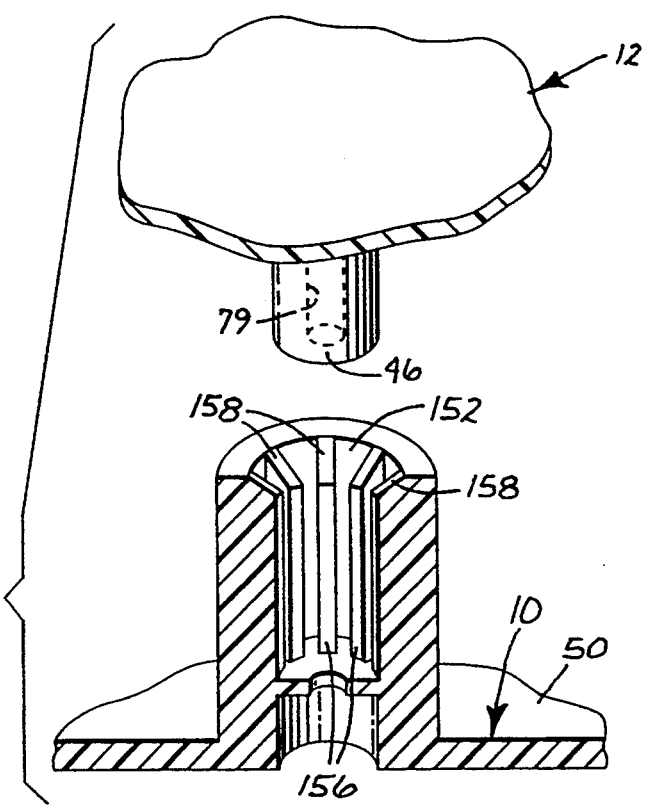
FIG. 3 is a perspective view, in partial cross section, of the screw bosses of the cassette according to the present invention.

In conventional VHS cassettes, screw bosses 44 align the base 10 with the cover 12, by, for example, a solid internal cylindrical surface 152 which overlaps an external cylindrical surface 154 of the cover screw boss with a large clearance, as shown in FIG. 2 and explained above. According to the present invention, the internal surface 152 need not be a continuous surface, but can be a rib-defined cylinder, as shown in FIG. 3, in which the diameter of the internal surface 152 is defined by edges 156 of ribs 158. While this use of ribs slightly reduces the amount of material consumed, it significantly improves cooling of the part, and decreases the molding cycle time, especially where the screw bosses are the slowest cooling parts. While eight ribs 158 are preferred to define the surface 152, fewer or more ribs could be used.

Numerous characteristics, advantages, and embodiments of the invention have been described in detail in the foregoing description with reference to the accompanying drawings. However the disclosure is illustrative only and the invention is not intended to be limited to the precise embodiments illustrated. Various changes and modifications may be effected therein by one skilled in the art without departing from the scope or spirit of the invention. For example, although the invention has been described with respect to videocassettes, the invention has application with any cassette type as well as other parts formed by molding.

We claim:

1. A cassette housing comprising:

a base; and a cover mounted on the base; and means for locating the base with respect to the cover and for assisting fastening the base to the cover, wherein the locating and the fastening assisting means comprises a plurality of bosses mounted on the base and an equal number of bosses mounted on the cover, wherein the cover bosses correspond in location to respective base bosses, wherein one of the base bosses and cover bosses are receiving bosses, and the other of the base bosses and cover bosses are received within respective receiving bosses, wherein the cover is connected to the base by connection between the base bosses and cover bosses, and wherein each receiving boss has an inner surface defining a plurality of ribs, wherein when the boss that is received by the receiving boss is centered within the receiving boss the boss and the receiving boss do not sufficiently contact each other along their adjacent respective outer and inner surfaces to deform any ribs, and wherein there is a slight clearance without frictional interference between each cover boss and its corresponding base boss when the bosses are mated to provide sufficient support for the bosses and to reduce shearing failure and breakage of the cassette during impacts on the cassette wherein when the boss that is received by the receiving boss is centered within the receiving boss the boss and the receiving boss do not sufficiently contact each other along their adjacent respective outer and inner surfaces to deform either boss.

2. The cassette housing of claim I wherein the boss received by the receiving boss extends slightly beyond the a centerline of the cassette.

3. The cassette housing of claim 2 wherein less than 35% of the inner boss extends beyond the centerline of the cassette.

4. The cassette housing of claim 2 wherein the base bosses and cover bosses are cylindrical.

5. The cassette housing of claim 4 wherein the plurality of ribs are radially located along a circle and are axial to form the cylindrical inner surface.

6. The cassette housing of claim 5 wherein the plurality of ribs are equiangularly spaced around the circle.

7. The cassette housing of claim 1 wherein the clearance between the receiving boss and the other boss is less than 10% of the diameter of the other boss.

8. The cassette housing of claim 2 wherein the cover bosses are received within the base bosses.

9. The cassette housing of claim 8 further comprising fasteners which pass through the base bosses and into the cover bosses to further secure the base and cover together.

10. A cassette housing comprising:
a base comprising a plurality of bosses; and
a cover comprising a plurality of bosses, wherein the cover bosses correspond in location to respective base bosses wherein one of the base bosses and cover bosses are receiving bosses, and the other of the base bosses and cover bosses are received within respective receiving bosses, wherein the cover is connected to the base by connection between the base bosses and cover bosses, wherein each receiving boss has an inner surface defined by a plurality of ribs, wherein there is a slight clearance without frictional interference between ribs of each receiving boss and the outer surface of the boss which it receives when the bosses are mated to provide sufficient support for the bosses without causing cassette warpage and to reduce shearing failure and breakage of the cassette during impacts on the cassette, wherein when the boss that is received by the receiving boss is centered within the receiving boss the boss and the receiving boss do not sufficiently contact each other along their adjacent respective outer and inner surfaces to deform either boss and wherein each boss which is received extends slightly beyond a centerline of the housing.

11. A cassette comprising:
a base comprising a plurality of bosses;
a cover comprising a plurality of bosses, wherein the cover bosses correspond in location to respective base bosses, wherein one of the base bosses and cover bosses are receiving bosses, and the other of the base bosses and cover bosses are received within respective receiving bosses, wherein the cover is connected to the base by connection between the base bosses and cover bosses, wherein each receiving boss has an inner surface defined by a plurality of ribs, and wherein there is a slight clearance without frictional interference between each cover boss and its corresponding base boss when the bosses are mated to provide sufficient support for the bosses and to reduce shearing failure failure and breakage of the cassette during impacts on the cassette, wherein when the boss that is received by the receiving boss is centered within the receiving boss the boss and the receiving boss do not sufficiently contact each other along their adjacent respective outer and inner surfaces to deform either boss;
a supply reel of tape;
a take-up reel; and
a door which is attached to the cover.

* * * * *

UNITED STATES PATENT AND TRADEMARK OFFICE
CERTIFICATE OF CORRECTION

PATENT NO.: 5,440,439
DATED: August 8, 1995
INVENTOR(S): Rambosek et al.

It is certified that error appears in the above-identified patent and that said Letters Patent is hereby corrected as shown below:

Column 2, Line 41, insert:

--Since cassette bases and covers have sections having a variety of shapes and thicknesses, these various sections will require different times to cool during injection molding. The overall cooling time required for the part will be determined by the slowest cooling section, called the "critical section for cooling." Further, as the cooling time for some sections is shortened by thinning, it is possible that another section may become the critical section. Therefore, thinning of only the wall sections may not be sufficient to significantly shorten the overall cooling time for the part. None of the known configurations for cassette bases and covers shorten the cooling time during injection molding for sections other than the wall sections.

In the known configuration of the screw bosses for cassettes, shown in Figure 2, the inner screw boss 46 on the cover 12 is received within the outer screw boss 44 on the base 10. The screw boss 46 extends far beyond the centerline of the cassette and seats at the bottom of the screw boss 44. There is a large clearance between the external surface 154 of the cover screw boss 46 and the internal surface 152 of the base screw boss 44. A screw 48 passing through the screw bosses 44, 46 holds the bosses together and thereby holds the base 10 to the cover 12 to form the cassette. However, this screw boss configuration is unacceptable when used in cassettes formed with thin

UNITED STATES PATENT AND TRADEMARK OFFICE
CERTIFICATE OF CORRECTION

PATENT NO.: 5,440,439
DATED: August 8, 1995
INVENTOR(S): Rambosek et al.

It is certified that error appears in the above-identified patent and that said Letters Patent is hereby corrected as shown below:

walls. During carton drop tests, the cassette can be irreparably damaged due to shearing failure between the base 10 and the cover 12 at the screw bosses.

Due to the limited support of the cover boss 46 within the base boss 44 and the length of the cover boss 46, the cover boss 46 bends and breaks from its attachment point on the cover 12. Adding an angled portion of the base boss 44 to guide the cover boss 44 does not address this problem.--

Column 2, Line 67, after "plurality", insert --of ribs--.

Column 4, Line 42, after "bosses,", delete "and".

Column 4, Line 60, "claim I" should read --claim 1--.

Column 4, Line 62, delete the first "the".

Signed and Sealed this

Thirtieth Day of April, 1996

BRUCE LEHMAN

*Attesting Officer*    Commissioner of Patents and Trademarks